United States Patent [19]

Schwanz et al.

[11] 4,249,756
[45] Feb. 10, 1981

[54] PASSIVE SAFETY BELT ARRANGEMENT FOR VEHICLES, IN PARTICULAR PASSENGER AUTOMOBILES

[75] Inventors: Wilfried Schwanz, Ahnsen; Ulrich Seiffert, Braunschweig, both of Fed. Rep. of Germany

[73] Assignee: Volkswagenwerk Aktiengesellschaft, Wolfsburg, Fed. Rep. of Germany

[21] Appl. No.: 40,440

[22] Filed: May 18, 1979

[30] Foreign Application Priority Data

May 20, 1978 [DE] Fed. Rep. of Germany ...... 2822064

[51] Int. Cl.³ .............................................. B60R 21/10
[52] U.S. Cl. ................................................... 280/804
[58] Field of Search ..................... 280/804, 803, 802; 297/469, 468

[56] References Cited

U.S. PATENT DOCUMENTS

| | | | |
|---|---|---|---|
| 3,842,929 | 10/1974 | Wada et al. | 280/804 |
| 3,860,260 | 1/1975 | Kazaoka et al. | 280/803 |
| 3,900,078 | 8/1975 | Otani | 280/804 |
| 3,971,570 | 7/1976 | Nilsson et al. | 280/804 |
| 4,039,224 | 8/1977 | Bauer et al. | 280/804 |
| 4,061,365 | 12/1977 | Nagano et al. | 280/804 |

*Primary Examiner*—John A. Pekar
*Attorney, Agent, or Firm*—Brumbaugh, Graves, Donohue & Raymond

[57] ABSTRACT

A passive safety belt arrangement for vehicles includes a motor and an actuating element that is strong in tension and compression. This element is driven in either of its longitudinal directions so as to propel a traveler attached to one end of the belt along a track on the body of the frame of the vehicle between a release position and a restraint position. A control system for the motor has at least two limit switches assigned to the two extreme positions of the traveler. One of the switches assigned to the release position is arranged so that it is actuable by a stud at the end of the actuating element which is away from the end holding the traveler.

3 Claims, 1 Drawing Figure

U.S. Patent
Feb. 10, 1981
4,249,756
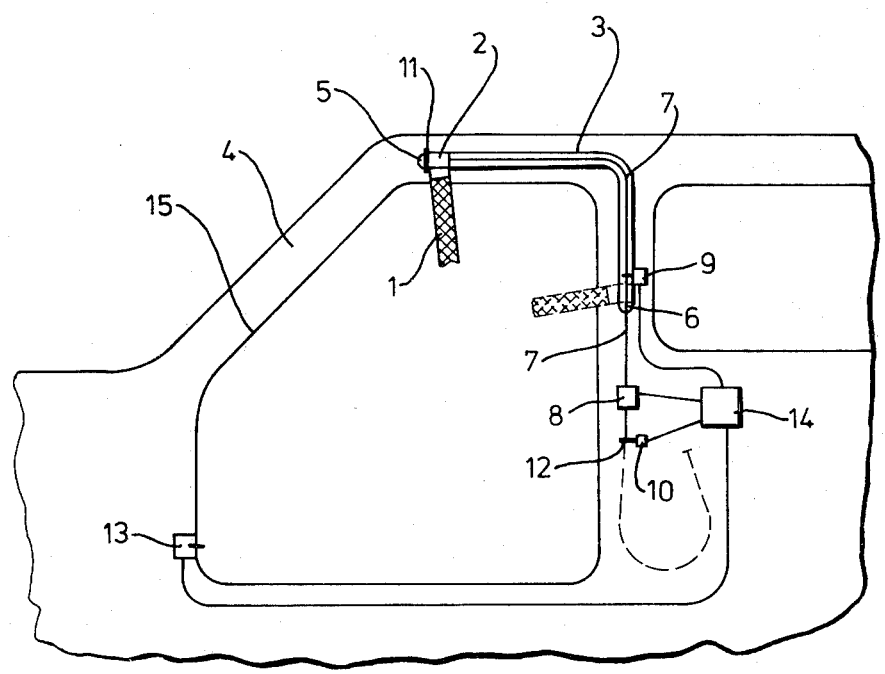

PASSIVE SAFETY BELT ARRANGEMENT FOR VEHICLES, IN PARTICULAR PASSENGER AUTOMOBILES

BACKGROUND OF THE INVENTION

The present invention relates to a passive safety belt arrangement for vehicles, and more particularly, to a control switching arrangement for safety belts in which one end of the belt is driven between a releasing position and a restraining position.

In the use of vehicles, in particular passenger automobiles, many riders have found the attachment and release of the safety harness to be an awkward and inconvenient task. In order to automate this operation, so-called passive-type safety harness arrangements have previously been proposed. With these passive-type arrangements a slide or traveler attached to one end of the harness is designed to be propelled along a track on the frame of the vehicle between a release position, where the harness is held away from the body of the rider, and a restraint position, in which the harness is brought into contact with the body of the rider. It is typically propelled by means of an actuating element that is rigid in tension and compression. The traveler is located at one end of the actuating element, which element is driven in either longitudinal direction by a motor, for example an electric motor. The actuating element may be made in the form of a flexible shaft of the type known to be used to operate lowerable vehicle windows or the like. This type of shaft includes a steel cable spirally wound with a steel wire helix.

To control the motor, in particular to switch it off upon completion of the travel of the actuating element, limit switches associated with the two extreme positions of the traveler are provided in the track. One of these switches is arranged at the end of the track corresponding to the restraint position of the harness and is actuable by a stud provided at the end of the actuating element holding the traveler. In earlier German Application Pat. No. 2726261, which is directed to an actuating device for a passive restraint harness system, it was proposed that the other limit switch, assigned to the release position of the traveler, be arranged at the other end of the track. This release position switch, like the restraint switch, is actuable by the stud provided at the traveler end of the actuating element. However, this previous arrangement has the disadvantage that the limit switch assigned to the release position is located in a region of the vehicle interior adjacent the windshield post, which region is a possible point of impact of the rider's head during an accident. As a result this region should be kept clear of any hard and dangerous projections. Furthermore, this particular post is designed as slender as possible, so that there is hardly any room for a recessed mounting of such a switch, or even its wiring.

SUMMARY OF THE INVENTION

The present invention is directed to improving a passive-type safety harness arrangement of the previously-mentioned sliding-belt type by providing a more favorable and less hazardous location for the release position limit switch.

In an illustrative embodiment of the invention a passive belt arrangement for a vehicle is provided with a motor and an actuating element driven by the motor. The element is in the form of a flexible steel cable that is resistant to tension and compression forces. This cable has a slide or traveler attached to one end, which traveler is also connected to one end of the safety belt. The traveler is propelled along a track on the vehicle frame by the cable from a release position, in which the belt is raised from the body of a passenger in the vehicle, and a restraint position in which the belt is secured about his body. The motor is controlled by a unit that receives a signal from a limit switch that is actuated by a stud on the cable near the traveler when the traveler is in the restraint position. A limit switch associated with the release position is also provided.

According to the invention, a more favorable and less hazardous system is achieved if the release position limit switch is so arranged that when the traveler reaches the location corresponding to the release position of the harness, this switch is actuated by a stop provided at the end of the actuating element at a position remote from the end holding the traveler. Thus the second limit switch may be placed in a location near the motor and below the restraint position. In this position the switch is neither conspicuous visually nor hazardous. As a result of this arrangement, the windshield post is kept clear of any added accessories.

BRIEF DESCRIPTION OF THE DRAWINGS

The foregoing and other features of the present invention will be more readily apparent from the following detailed description and drawing of an illustrative embodiment of the invention in which the sole FIGURE schematically illustrates the interior of a vehicle adjacent a door opening arranged in the region of a seat equipped with a passive restraint safety harness.

DESCRIPTION OF AN ILLUSTRATIVE EMBODIMENT

The drawing shows a passive-type safety harness arrangement in which the shoulder end of a two-point diagonal shoulder strap 1 is articulately connected to a traveler 2 running in a track 3. The track 3 is secured to the frame 4 of the vehicle above a seat (not shown) and next to a door opening 15. In the track 3, which may for example be a slit tube, the traveler 2 is capable of being propelled between a location near the end 5 of the track, corresponding to the release position of the strap 1, and a location corresponding to the restraint position of the strap near the end 6 of the track. It is so propelled by means of an actuating element 7, which element is rigid in tension and compression, and is capable of being driven in either longitudinal direction by a motor 8, for example an electric motor. The element 7 may, for example, be a flexible shaft such as those used to raise and lower vehicle windows. These shafts comprise a steel cable spirally wound with a steel wire helix or coil and are known per se. The motor 8 is controlled by a control system 14 to which signals may be transmitted from various switches. The drawing indicates a first or restraint position switch 9 assigned to the restraint position of the strap 1, which switch, when the traveler 2 reaches the restraint position in track 3, is actuated by a stud 11 attached to the end of the flexible shaft element 7 that holds the traveler 2. A second or release switch 10, assigned to the release position of the strap 1, is arranged near and beneath the motor 8 and is actuated by a stud 12 provided near the other end of the element 7. Finally, a switch 13 is provided in the form of a door contact switch. Switch 13 transmits a signal corresponding to the condition of the door of the vehicle to the control system 14. While the limit switches 9 and 10 stop the motor 8 when the respective extreme positions are reached in order to avoid overload of the motor and needless consumption of current, the door contact switch 13 serves to start the motor 8. Of course, other switches may and generally will be provided to control the motor 8. Thus, for example, a switch connected to the ignition of the vehicle may be provided for causing the motor 8 to propel the traveler 2 from the release position to the restraint position when the ignition of the vehicle engine is switched on. A seat contact switch may also be provided in the seat corresponding to the strap 1, which contact switch permits the motor 8 to be switched on to propel the traveler 2 in the track 3 only when the seat in question is occupied by a rider.

By the arrangement of the release limit switch 10 in the region below the motor 8, so that it is actuated by the element 7 at a position away from the traveler end, the installation of a switch in the vicinity of end 5 of the track is avoided.

The function and operation of the passive-type safety harness controlled by the system 14 and driven by the motor 8 is such that upon entering the vehicle and switching on the engine ignition, the belt is propelled out of its release position into its restraint position. Preferably, however, this will happen only at those seats which are occupied by riders, and this condition is detected by means of seat contact switches. If a door of the vehicle is opened, for example to permit a rider to get out, the door contact switch transmits a signal to the control system 14 to propel the harness nearest the door, from its restraint position back into the release position. After the closing of the door, the harness is brought back into the restraint position provided the corresponding seat is occupied and the engine is running. Limit switches 9 and 10 merely transmit a signal to switch off the motor 8 when the harness has arrived in the release or restraint position, thereby avoiding an overloading of the motor.

While the invention has been particularly shown and described with reference to a preferred embodiment thereof, it will be understood by those skilled in the art that various changes in form and details may be made therein without departing from the spirit and scope of the invention.

We claim:

1. A passive safety belt arrangement for vehicles, for example passenger automobiles, comprising: a motor; a longitudinal actuating element that is strong in tension and compression and is capable of being driven by said motor in either longitudinal direction of said element; a traveler attached to one end of the safety belt and to the actuating element, said traveler being propelled along a track on the frame of the body of the vehicle by said actuating element between a release position and a restraint position for said belt; and a control system to control the motor, said control system including at least first and second limit switches indicating, respectively, when the traveler is in one of its two extreme positions, the first of said switches being arranged in the vicinity of the restraint position of said traveler at one end of the track and being actuable by a stud arranged on the actuating element adjacent the traveler, characterized in that the second limit switch, which indicates the release position of the belt and traveler, is at the same one end of the track as the first switch and is so arranged that when the traveler reaches the location corresponding to the release position of the belt, it is actuable by a stud arranged on the actuating element at a position remote from the traveler.

2. A passive safety belt arrangement for vehicles as claimed in claim 1 wherein said second switch is at a position in which it is inconspicuous and is remote from the region of the vehicle at the height of a passenger's head.

3. A passive safety belt arrangement for vehicles as claimed in claim 1 wherein said track has a horizontal section that extends horizontally above a door opening of the vehicle adjacent a seat equipped with the belt, from a forward release position to a rearward position, and a vertical section that extends vertically downward, from the rearward position of the horizontal section along the rear side of the door opening to a restraint position, said motor being located vertically below the vertical section of the track and said second limit switch being located vertically below said motor.

* * * * *